United States Patent [19]

Jensen

[11] 4,017,786
[45] Apr. 12, 1977

[54] TRANSFORMER SATURATION CONTROL CIRCUIT FOR A HIGH FREQUENCY SWITCHING POWER SUPPLY

[75] Inventor: Joseph C. Jensen, San Diego, Calif.
[73] Assignee: NCR Corporation, Dayton, Ohio
[22] Filed: July 26, 1976
[21] Appl. No.: 708,525
[52] U.S. Cl. ............................. 321/45 R; 321/11
[51] Int. Cl.² ....................................... H02M 7/537
[58] Field of Search .......... 321/2, 18, 11, 12, 45 R; 331/113 A

[56] References Cited
UNITED STATES PATENTS

| 3,133,241 | 5/1964 | White | 321/45 R |
|---|---|---|---|
| 3,349,311 | 10/1967 | Dudley | 321/2 |
| 3,539,905 | 11/1970 | Schwarz | 321/15 |

Primary Examiner—William M. Shoop
Attorney, Agent, or Firm—J. T. Cavender; Edward Dugas

[57] ABSTRACT

The present circuit prevents the overloading of power switching elements driving the primary winding of a saturable core transformer. The overloading protected against is a consequence of the differential between the volt-seconds supplied to the transformer core from one direction as opposed to the other direction, which differential, in turn, causes the flux level to integrate up the B-H loop resulting initially in unbalanced primary winding currents and ultimately in a premature saturation of the transformer core in one direction. The present circuit controls unbalanced transformer core saturation by forcing the core into saturation in alternate opposite directions during the periods when the power switching elements are off when core saturation can have no deleterious effect on the circuit operation. This is accomplished by providing a reset (bias) current to the transformer core during each off time, which reset current is in a direction that reenforces the trend towards saturation caused by the latest activation of the power switching elements. The effect is that when the next power switching element is activated it looks at a flux level which is as far away from its associated saturation point as possible. This in turn permits a maximum excursion of flux during the power switching elements drive time.

7 Claims, 4 Drawing Figures

FIG. 2
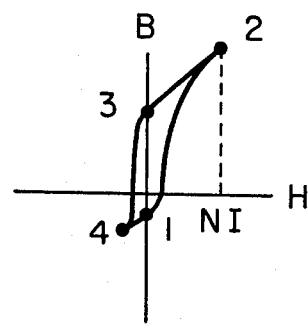
FIG. 3
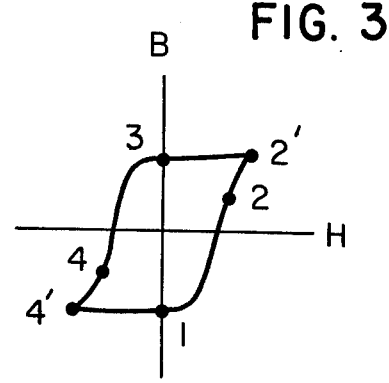
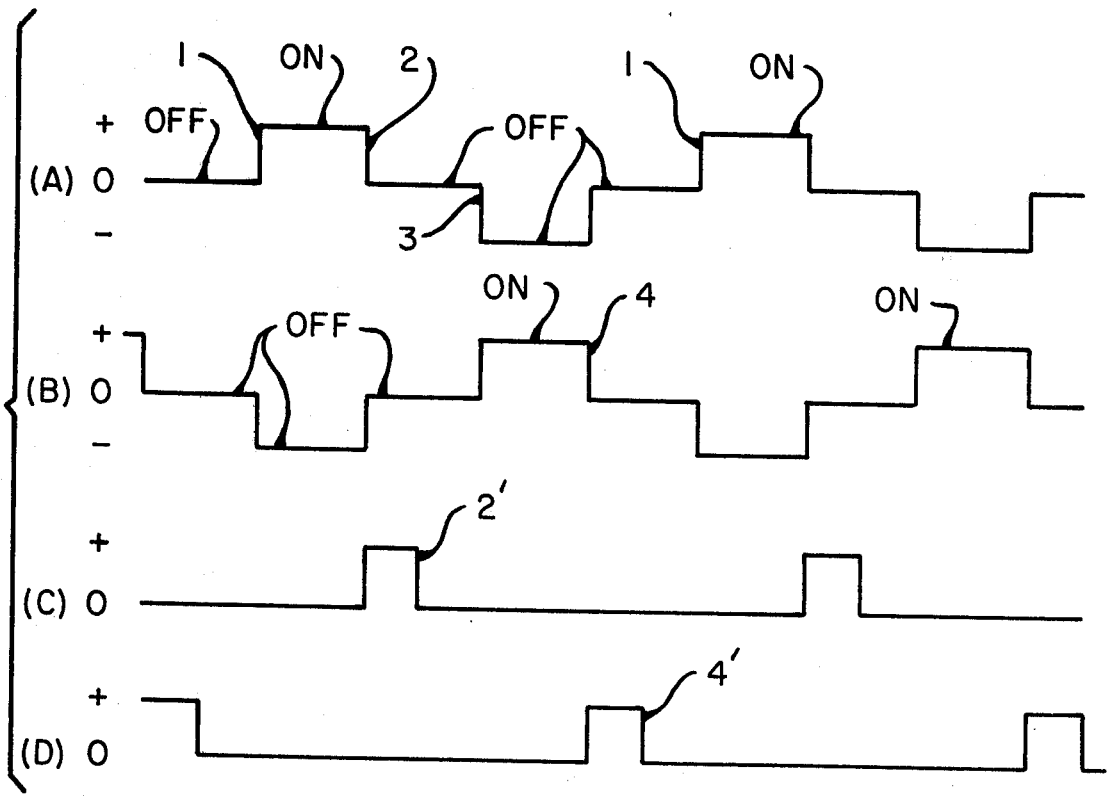
FIG. 4

TRANSFORMER SATURATION CONTROL CIRCUIT FOR A HIGH FREQUENCY SWITCHING POWER SUPPLY

BACKGROUND OF THE INVENTION

This invention relates to regulated power supplies of the type which utilize saturable core transformers and, more particularly, to high frequency switching power supplies of the inverter type.

Modern electronic equipment such as data processing equipment consumes considerable electrical energy, which energy must be provided at one or more relatively low voltage levels. Further, the power supplies providing this energy must be well-regulated in order to avoid the introduction of data errors into data processing equipment due to abrupt changes in the level of the supply voltage, and to transients.

Traditionally, a conventional power supply capable of providing well-regulated, low voltage, high current energy to a data processing unit has generally been comprised of an input step-down transformer which is coupled to a 50/60 cycle source; a high current, low voltage rectifier and filter; and a pass regulator. Differential comparison between the generated output voltage and a reference voltage has been the basis for a closed loop drive of the pass regulator. This classical approach offers excellent regulation, ripple, and dynamic response characteristics.

However, because of the necessity for utilizing a massive input transformer and for effecting direct regulation of high current, the traditional power supply of this type is very large, heavy and inefficient and also generates considerable heat which not only represents an energy loss in and of itself, but which also requires special cooling provisions. For these reasons, attention has therefore been directed to high frequency switching power supplies which provide a substantial reduction of the bulk and heat loss which characterize the prior art power supplies.

In a high frequency switching power supply, electrical energy from a line source is rectified and filtered directly to obtain a d-c unregulated voltage of, for example, approximately 150 volts. The unregulated d-c voltage is then applied directly to the primary winding center-tap of a high frequency inverter transformer. Switching transistors coupled to the ends of the primary winding are driven so as to alternately conduct at a relatively high frequency, e.g., 20 KHz, to introduce a high current at a low voltage into the inverter transformer secondary winding. The secondary current is rectified and filtered to provide the desired power for the data processing circuits. Regulation is typically achieved by monitoring the output voltage and appropriately adjusting the duty cycles of the switching transistors. Two classical power supply problems are thus eliminated. One, rather than a 50/60 KHz step-down transformer, a 20 KHz transformer is utilized. Thus, a transformer with a much smaller core can now be used and, second, regulation is effected on the high voltage, low current side of the system rather than the low voltage, high current side, such that the regulating system need not directly handle high current. As a result, heat losses are radically reduced.

The use of high frequency techniques requires care in the design and the selection of the components used, particularly the inverter transformer and the switching transistors. One particular problem related to the behavior of transformers can cause severe overheating and even catastrophic failure in the system. This problem is caused by a modest imbalance of the volt-seconds applied to the two halves of the inverter transformer primary winding. Whether this imbalance results from very slight differences in the pulse width of the drive to the power transistors, or from slight differences in the primary winding halves, or from other slight differences in the two primary drive systems, the results are the same namely a translation along the B-H curve of the transformer core until one side is driven into saturation. Core saturation causes the corresponding power switching transistors to draw excessive current which increases collector dissipation to destructive levels.

One prior art approach to solving this problem is disclosed in U.S. Pat. No. 3,873,903 by Philip W. Koetsch et al., which patent is assigned to the assignee of the present invention. In the power supply system disclosed therein, any difference in the current drawn through the power switching transistors is detected and this information is used to appropriately alter the duty cycle of one of the power switching transistor banks. This particular prior art approach can be classified as an electronic closed loop.

Another prior art circuit of interest is disclosed in U.S. patent application Ser. No. 632,129, entitled "Magnetic Circuit For A High Frequency Switching Power Supply", filed Nov. 14, 1975, by J. C. Jensen, which application is assigned to the assignee of the present application. The circuit of the referenced application utilizes a transformer employing two cores which are magnetically disposed in parallel. Individual reset windings for each core are provided, and the two reset windings are wound in opposite directions. Each reset winding is d-c biased whereby one core is correspondingly, magnetically biased in the direction of in-phase saturation in the positive direction and the other core is magnetically biased in the in-phase direction of saturation in the negative direction. Thus, during any half-cycle, the one core biased in the direction in-phase with the drive voltage will actuate. If saturation occurs, the other core then stands off the voltage, and the saturated core starts the succeeding half-cycle as far as possible from saturation in the opposite direction.

Although each of the aforementioned circuits appear somewhat satisfactory to accomplish a correction in the problem area, the present invention appears to be a viable alternate choice.

SUMMARY OF THE INVENTION

The preferred embodiment of the present invention utilizes a saturable core transformer having a primary winding, a secondary winding, and a tertiary winding. In addition, there is provided first and second power switching elements for operatively connecting a d-c power source in circuit with the primary winding of the transformer. A driving means connected in circuit to the first and second power switching elements alternately renders said power switches conductive with periods of overlapping non-conductivity therebetween, so as to tend to cause saturation in the core first in one direction and then in the opposite direction. A biasing means is operatively connected to the tertiary winding for completing the saturation of the core member during the period of overlapping non-conductivity of the first and second power switching elements. By completing the saturation of the core during each half-cycle when the power switches are not in the conducting mode, operation from a starting point (a flux level) as far away from opposite saturation point is assured. Such an operation allows for the maximum excursion of flux during the drive time associated with the conduction mode of a power switch. The aforementioned circuitry finds particular utility in a switching power supply of the inverter type.

From the foregoing it can therefore be seen that a broad object of the present invention is to provide an improved switching power supply.

It is another object of the present invention to provide a switching power supply in which the deleterious effects of volt-second imbalance in the primary winding of the transformer are eliminated.

It is another object of the present invention to provide a circuit means for insuring the biasing out of imbalances in the saturation of a saturable core transformer during non-drive periods of transformer operation.

These and other objects of the present invention will become more apparent when taken in conjunction with the following description and drawings, throughout which like characters indicate like parts and which drawings form a part of this application.

BRIEF DESCRIPTION OF THE DRAWINGS

FIG. 2 is a chart illustrating the B-H curve for a system having volt-second imbalance;

FIG. 3 is a chart illustrating the B-H curve associated with the preferred embodiment shown in FIG. 1;

FIGS. 4A to 4D are waveforms taken at selected points on the preferred embodiment shown in FIG. 1.

DESCRIPTION OF THE PREFERRED EMBODIMENT OF THE INVENTION

Figure 1:
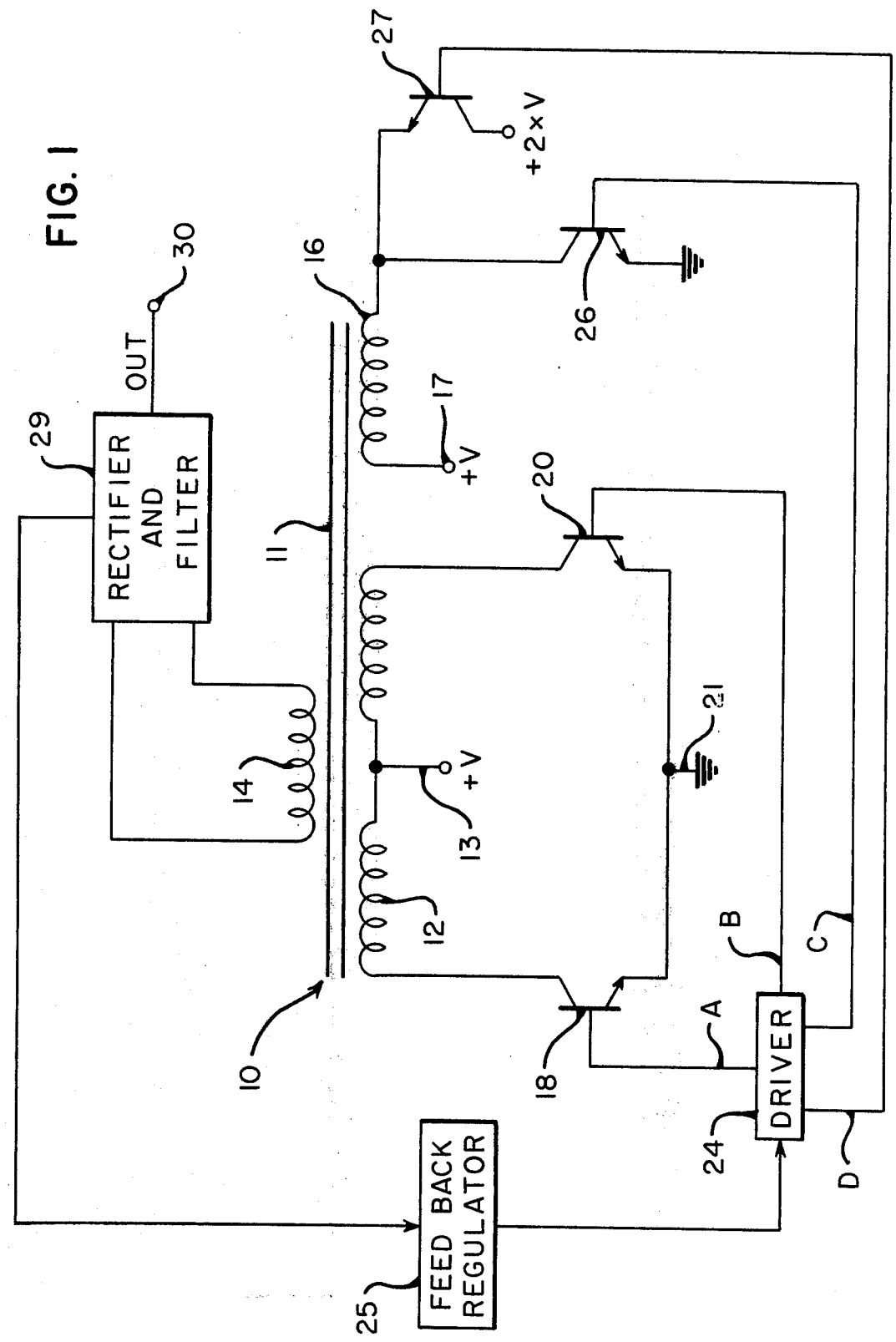
FIG. 1 is a schematic diagram of the preferred embodiment of the invention.

Referring to FIG. 1, a transformer 10 comprised of a saturable core 11, a primary winding 12 which is center tapped at tap 13, a secondary winding 14 along with a tertiary winding 16. The primary winding of transformer 10 is connected at one end to a first power switch 18 and at the other end to a second power switch 20. In the embodiment shown, each of the power switches are NPN transistors having their respective collectors connected to the ends of the primary winding 12 and their emitters connected to a common potential point-in this particular embodiment ground. Those persons skilled in the art will appreciate that the power switching transistors 18 and 20 may, in practice, each comprise a parallel bank of transistors, the number required being dependent upon the current requirement of the system and the individual power handling capabilities of the particular type of transistor employed. The base of transistor 18 and the base of transistor 20 are connected in circuit to a driver 24. The center tap 13 is connected to a high voltage d-c source labeled +V. In the preferred embodiment of the invention the driver circuit 24 was operated approximately 20 KHz. The power switching transistors 18 and 20 are selectively placed into conducting and non-conducting modes in order to cause a current to flow through the primary winding 12. Generally speaking, the second winding 14 steps up the current appearing in the primary winding, while reducing the voltage across the secondary winding. The signal appearing across the secondary winding 14 is fullwave rectified and filtered by the rectifier filter 29. The output of the circuit is available at terminal 30.

The tertiary winding 16 has one end connected to the voltage source +V by means of terminal 17. The opposite end of the tertiary winding 16 is connected to the emitter of an NPN transistor 27 and to the collector of an NPN transistor 26. The emitter of transistor 26 is connected to ground while the collector of transistor 27 is connected to a voltage source which is twice the magnitude of the voltage source +V. Transistors 26 and 27 along with the tertiary transformer winding 16 constitute a means for biasing the core 11 into complete saturation. The bases of transistors 26 and 27 are driven by the driver 24 via the drive lines labelled C and D respectively. The level of the output voltage from the rectifier and filter circuit 29 is fed back to a feedback regulator 25. As is well known in the art, the feedback regulator 25 provides an error signal indicative of the level of the output voltage as compared to a desired level. This error signal is then fed to the driver circuit 24 wherein the error signal controls the "OFF" and "ON" times for the conducting and non-conducting states of transistors 18 and 20 so as to maintain the error signal from the feedback regulator 25 at a minimum level.

Referring now to the charted waveform of FIG. 2 in conjunction with FIGS. 4A and 4B. For the circuit shown in FIG. 1, the waveform 4A is applied to the base of the power switch 18 while the waveform of FIG. 4B is applied to the base of the power switch 20. As can be seen by the OFF and ON marks associated with the two waveforms, the switches 18 and 20 are alternately turned ON with periods of non-conductivity located between the ON times. These non-conductive periods overlap such that neither power switch 18 or power switch 20 are ON simultaneously, thereby creating dead bands. The flux in the saturable core 11 then acts as follows: when the A drive to power switch 18 is ON, corresponding to the periods 1 to 2, then the flux goes from 1 to 2 as shown specifically in FIG. 2. When the drive is OFF, the inductive pulse resets the flux from 2 to 3. The B drive then comes on during the period 3 to 4 and the flux goes from 3 to 4 as shown in FIG. 2. When the drive is OFF the flux goes from 4 to 1 and the sequence repeats itself. It is to be noted in FIG. 2 that the B-H curve is not centered around the B-H intersection point. This offset condition, if allowed to exist for a number of operating cycles, will cause the core to saturate, which in turn will require increasing amounts of current from the primary drive circuit. This current will continue to increase at a rapid rate as long as voltage is applied to the primary winding. This will eventually result in the destruction of the drive circuit or its ability to provide voltage, thereby disabling the circuit.

With the use of the biasing circuit, the B-H curve can be formed more symetrically around the B-H intersection point. This can be seen by referring to FIG. 3 in conjunction with the FIG. 4A to 4D waveforms. At point 1 the waveform A applied to the power switch 18 turns the power switch 18 on, which in turn moves the saturation of the transformer along the curve from 1 towards point 2. As can be seen, point 2 is not a complete saturation point and if the drive were to be terminated at that point an imbalance would occur when the transformer were driven into or towards saturation in the opposite direction. To force the core into complete saturation, a biasing current is applied to the tertiary winding. This is accomplished by applying the FIG. 4C waveform to the base of transistor 26. As can be seen, during the OFF time, or dead time, of power switch 18 and 20, the transistor 26 is turned on for a period of time which insures that the saturation of the core will reach the saturation point 2'. The core being totally saturated in the one direction now is ready to receive the pulse from FIG. 4B, which pulse turns on the power 20 and drives the core from the point 3 to point 4. Again point 4 is less than the total saturation point of the core and by applying the waveform of FIG. 4D to the base of transistor 27, transistor 27 is turned on for a period of time which insures that the flux moves along the saturation curve from point 4 to point 4'. At this point, when the power switches 18 and 20 and transistors 26 and 27 are turned OFF, the saturation curve moves from 4' to point 1 and the cycle is ready to repeat.

From the foregoing it can be seen that any volt-second unbalance in the transformer is eliminated during one complete cycle of the circuit utilizing the present system. It is to be particularly noted that this technique only requires a sufficient amount of power to complete the saturation from a direction wherein it was already commenced in the normal drive operation.

Although the invention has been described and illustrated in detail, it is to be clearly understood that the same is by way of illustration and example only and is not to be taken by way of limitation, the spirit and scope of this invention being limited only by the terms of the appended claims.

It is claimed:

1. A power supply circuit comprising:
   a saturable core transformer, said transformer including a primary winding, a secondary winding for feeding a load and a tertiary winding;
   first and second power switching elements for operatively connecting a power source in circuit with the primary winding of said transformer;
   drive means for alternately rendering said power switching elements conductive with periods of overlapping non-conductivity therebetween, wherein each of said power switching elements tends to cause saturation in said saturable core transformer in opposite directions;
   biasing means operatively connected to said tertiary winding for completing the saturation of said saturable core transformer, in the direction started by a power switching element, during said periods of overlapping non-conductivity.

2. The circuit according to claim 1 wherein the primary winding of said saturable core transformer has a center tap and wherein said first power switching element is connected between one end of said primary winding and a common electrical point and wherein said second power switching element is connected between the other end of said primary winding and said common electrical point, said common electrical point and said center tap adapted to receive a power source therebetween.

3. The circuit according to claim 1 wherein said biasing means is comprised of:
   means for directing a current flow thru said tertiary winding in a direction which complements the direction of saturation in said saturable core transformer caused by said first power switching element; and
   means for directing a current flow thru said tertiary winding in a direction which complements the direction of saturation in said saturable core transformer caused by said second power switching element.

4. The circuit according to claim 1 wherein said biasing means is comprised of:
   a power source;
   means for operatively connecting said power source in circuit with said tertiary winding during periods of overlapping non-conductivity of said first and said second power switching elements so as to complete the saturation of the core of said saturable core transformer.

5. A transformer coupled circuit comprising:
   a transformer including a saturable core member, a center tapped primary winding, a secondary winding and a tertiary winding;
   a potential source connected between the center tap of said primary winding and a reference point;
   a first switching element connected between one end of said primary winding and said reference point;
   a second switching element connected between the other end of said primary winding and said reference point;
   driver means for alternately rendering said first and said second switching element conductive with periods of overlapping non-conductivity therebetween, whereby each of said switching elements tends to cause saturation of said saturable core in opposite directions;
   means operatively connected to said tertiary winding means for completing the tended saturation of said core member in the direction dictated by the last conductive switching element.

6. The circuit according to claim 5 wherein said means operatively connected to said tertiary winding is comprised of:
   means for directing a current flow thru said tertiary winding in a direction which complements the direction of saturation in said saturable core transformer caused by said first switching element; and
   means for directing a current flow thru said tertiary winding in a direction which complements the direction of saturation in said saturable core transformer caused by said second switching element.

7. The circuit according to claim 5 wherein said biasing means is comprised of:
   a power source;
   means for operatively connecting said power source in circuit with said tertiary windings during periods of overlapping non-conductivity of said first and said second switching elements so as to complete the saturation of the core of said saturable core transformer.

* * * * *